(12) United States Patent
McDonald et al.

(10) Patent No.: US 10,591,950 B2
(45) Date of Patent: Mar. 17, 2020

(54) COPOLYMERIZED BIS-(ETHYLENE OXY) METHANE POLYSULFIDE POLYMER AND HYDROXYL TERMINATED POLY BUTADIENE AS A SOLID FUELED RAMJET FUEL

(71) Applicant: United States of America as represented by the Secretary of the Army, Washington, DC (US)

(72) Inventors: Brian McDonald, Taft, TN (US); Jeremy Rice, Huntsville, AL (US); John Stewart, Redstone Arsenal, AL (US)

( * ) Notice: Subject to any disclaimer, the term of this patent is extended or adjusted under 35 U.S.C. 154(b) by 274 days.

(21) Appl. No.: 15/491,433

(22) Filed: Apr. 19, 2017

(65) Prior Publication Data

US 2018/0305271 A1    Oct. 25, 2018

(51) Int. Cl.
| | |
|---|---|
| *C06D 5/00* | (2006.01) |
| *F02K 7/10* | (2006.01) |
| *C10L 5/00* | (2006.01) |
| *G06D 5/00* | (2006.01) |
| *F02K 9/95* | (2006.01) |
| *C10L 5/40* | (2006.01) |

(52) U.S. Cl.
CPC ............... *G06D 5/00* (2013.01); *C10L 5/00* (2013.01); *C10L 5/406* (2013.01); *F02K 7/105* (2013.01); *F02K 9/95* (2013.01); *C10L 2200/0259* (2013.01); *C10L 2200/0263* (2013.01); *C10L 2250/04* (2013.01); *C10L 2270/04* (2013.01)

(58) Field of Classification Search
CPC ............... C06D 5/00; F02K 9/95; C10L 5/00
See application file for complete search history.

(56) References Cited

U.S. PATENT DOCUMENTS

| | | | | |
|---|---|---|---|---|
| 3,069,844 | A * | 12/1962 | Bearer | C06C 9/00 |
| | | | | 102/285 |
| 3,170,283 | A * | 2/1965 | Sayles | C06B 47/10 |
| | | | | 149/19.1 |
| 6,183,574 | B1 * | 2/2001 | Warren | C06B 21/0025 |
| | | | | 149/109.6 |
| 6,258,188 | B1 * | 7/2001 | Hatcher | C06B 45/105 |
| | | | | 149/19.4 |
| 6,682,614 | B1 * | 1/2004 | Chan | C06B 45/02 |
| | | | | 149/19.4 |
| 2006/0048492 | A1 | 3/2006 | Cork | |
| 2008/0196463 | A1 | 8/2008 | Hudson | |

(Continued)

FOREIGN PATENT DOCUMENTS

EP    0520104 A1 * 12/1992 ........... C06B 45/105

*Primary Examiner* — Aileen B Felton (57) ABSTRACT

The application relates to a Ramjet solid fuel having an ignition temperature of less than 400° C., the fuel comprising a bis-(ethylene oxy) methane polysulfide polymer (BMPP) and hydroxyl-terminated polybutadiene (HTPB), the copolymer having a BMPP/HTPB weight ratio of from 1/3 to 3/1; and the fuel comprising at least 85 weight % copolymer. The BMPP comprises from 5 to 8 weight percent mercaptan. Furthermore, the BMPP is selected from $HS(RSS)_aCH_2CH((SSR)_cCSH)CH_2(SSR)_bSH$    a)

where $R=-(CH_2)_2OCH_2O(CH_2)_2-$ and $a+b+c<7$; and $H(SC_2H_4OCH_2OC_2H_4S)_nH$ where $n=7$.    b)

2 Claims, 11 Drawing Sheets

(56) References Cited

U.S. PATENT DOCUMENTS

| | | |
|---|---|---|
| 2009/0205311 A1 | 8/2009 | Bulman |
| 2015/0065600 A1 | 3/2015 | Ye |
| 2016/0032058 A1 | 2/2016 | Ye |

* cited by examiner

··•·· HTPB
━▲━ LP33-HTPB
━■━ LP33

COPOLYMERIZED BIS-(ETHYLENE OXY) METHANE POLYSULFIDE POLYMER AND HYDROXYL TERMINATED POLY BUTADIENE AS A SOLID FUELED RAMJET FUEL

BACKGROUND

Currently, the most commonly used ramjet fuel is based on hydroxyl terminated poly butadiene (HTPB) polymer with the addition of boron or aluminum powder to increase density and specific impulse.

DETAILED DESCRIPTION

A Ramjet fuel formulation that consists of the copolymerization of a bis-(ethylene oxy) methane polysulfide polymer (BMPP) and HTPB has been successfully constructed. Specific embodiments of BMPP include a) GS-44 (full name Thioplast™GS-44 produced by Akzo Nobel Functional Chemicals GmbH & Co.) or GS-4 (full name Thioplast™GS-4 produced by Akzo Nobel Functional Chemicals GmbH & Co.) having the chemical structure $HS(RSS)_a CH_2 CH((SSR)_c CSH)CH_2(SSR)_b SH$, where $R=-(CH_2)_2 OCH_2 O(CH_2)_2-$ and $a+b+c<7$; and b) LP-33 or LP-3 (full name Thiokol™ LP-3, produced by Toray Fine Chemicals Co., Ltd.) having the chemical structure $H(SC_2H_4 OCH_2 OC_2 H_4 S)_n H$ where $n=7$. The various forms of BMPP are compared in Table 1 to show variations in chemical compositions and properties.

TABLE 1

| Properties | LP-33 | LP-3 | G-44 | G-4 |
|---|---|---|---|---|
| Viscosity @25° C. (Pa-s) | 1.8 | 1.2 | 1.3 | 1.3 |
| Mercaptan Content (%) | 5.0-6.5 | 5.9-7.7 | >5.9 | >5.9 |
| Average Molecular Weight | 1000 | 1000 | 1100 | 1100 |
| Cross-linking Agent (%) | 0.5 | 2.0 | 0.5 | 2.0 |
| Specific Gravity | 1.27 | 1.27 | 1.26 | 1.26 |

The form of HTPB used is HTPB (R45-M) which has the chemical structure: $HO[(CH_2CHCHCH_2)_{0.6}(CH_2CHR)_{0.2}(CH_2CHCHCH_2)_{0.2}]_n OH$ where $R=-CHCH_2$ and the molecular weight is approximately 2800.

The density of HTPB (R45-M) is approximately 0.9 g/cm³ as compared to the bis-(ethylene oxy) methane polysulfide polymer (BMPP) (specifically LP-33, full name Thiokol™ LP-33, produced by Toray Fine Chemicals Co., Ltd.) which has a density of 1.27 g/cm³ for a ratio of 0.71. HTPB generates a very high Isp but the Isp-density is limited by the material's low density. In addition, HTPB decomposes at approximately 425° generating gasses that ignite well above 500° C. In contrast, LP-33 has a much higher material density, decomposes at approximately 300° C. and generates gasses that autoignite near 380° C. The primary disadvantage of the LP-33 is the low Isp resulting from reduced energy and high molecular weight exhaust species.

Among the advantages of the BMPP-HTPB copolymer is that the high performance characteristics of HTPB are combined with the low ignition temperature characteristics of the BMPP. The net result is a material that improves the ignition and flame retention characteristics of HTPB without excessive sacrifice of performance. This formulation for the design of a ramjet engine that can be ignited by free stream enthalpy at lower than conventional takeover Mach numbers without the need for an igniter and operate with expanded flammability limits lending to higher altitude, low drag flight profiles.

The present application has particular use in the field of solid fueled ramjets where low takeover velocities and thus low inlet temperatures are available. The invention is applicable for the Army's deep strike missions where extended range is desired. The invention reduces the required ignition energy with the option of eliminating an igniter with sufficient boost velocity while maintaining the higher performance characteristics of the HTPB polymer.

The main features of this application is the copolymerization of HTPB with BMPP to produce a material that utilizes a common curative. The resulting material exhibits excellent Shore-A hardness values and has demonstrated stable combustion at ambient pressures. Thermochemical calculations show that the material has a very good Isp-density.

The primary advantage of the BMPP-HTPB copolymer is the combination of the high ISP characteristic of the HTPB with the low ignition and high density features of the BMPP. The combined material has improved Isp-density with reduced ignition energy requirements. The mixture of the two materials also allows for the tailoring of the mass burn rates of the fuel formulations.

The main feature of this application is the use of BMPP as the fuel polymer in solid fueled ramjets. LP-33 has historical use as a binder in composite solid propellant applications. A literature of published papers and patents has revealed no applications where a polysulfide based polymer has been used as a fuel in an air breathing system.

The primary advantage of the BMPP based fuel is the low decomposition temperature, and the generation of low ignition temperature gasses with low flammability limits. The low decomposition and ignition temperature allows for lower burnout velocities and thus reduced boost propellant mass, the elimination of an igniter, and multiple re-ignition capability.

The present application which relates to a copolymer of BMPP and HTPB as a ramjet fuel can be contrasted with the current state of the art ramjet fuel which is based on HTPB polymer alone. The density of HTPB (R45-M) is 0.9 g/cm$^3$ as compared to BMPP which has a density of 1.27 g/cm$^3$. The BMPP/LP-33 density ratio is 0.71. The adiabatic flame temperature for a stoichiometric mixture of HTPB/air is approximately 2380 K as compared to BMPP/air which has an adiabatic temperature of 2199 K. Thus an HTPB/BMPP specific impulse (Sip) ratio is approximately 1.04.

To account for the density deficit that HTPB fuels inherently have, powdered boron is typically added at a mass fraction of approximately 30%. Boron not only increases the density of the fuel but also increases the Isp because of a significant increase in the adiabatic flame temperature. However boron can be slow to burn at the lower chamber temperatures which are typical in air breathing engines and thus combustion efficiency can be lower than unloaded fuels if sufficient mixing length (residence time) is not available. Since Isp increases with the square root of temperature, increasing the impulse density through flame temperature is much less efficient than through density. However, the BMPP/HTPB copolymer formulation can benefit from the addition of metal fuels as well and thus this work has included the evaluation of the addition of aluminum powder. A Solid Fueled Ramjet cycle and trajectory analysis was conducted to develop design parameters for specific mission needs.

Figure 1:
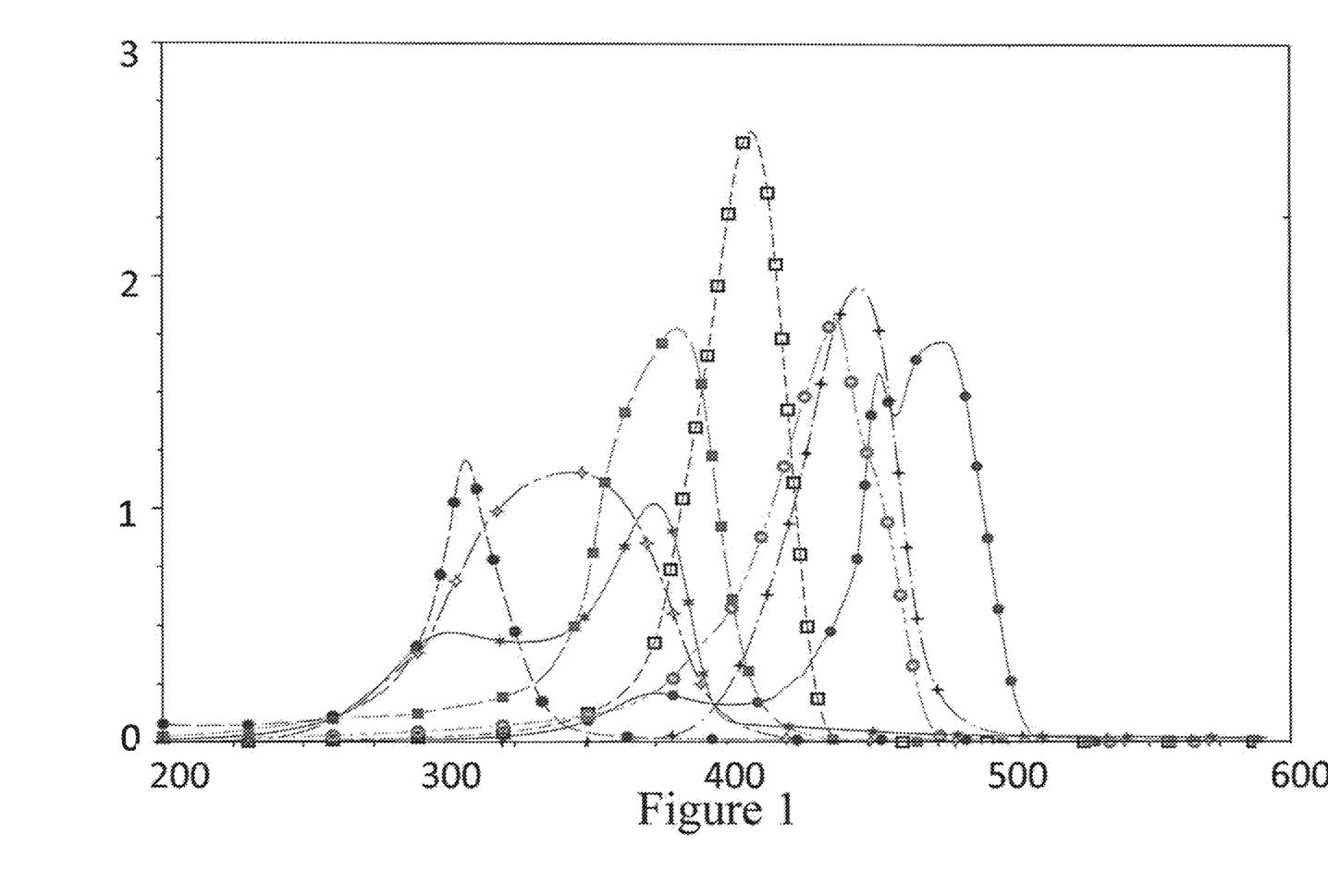
FIG. 1 is a graph plotting derivative weight vs. temperature in thermogravimetric analysis (TGA) for various solid fuel polymers.
Figure 2:
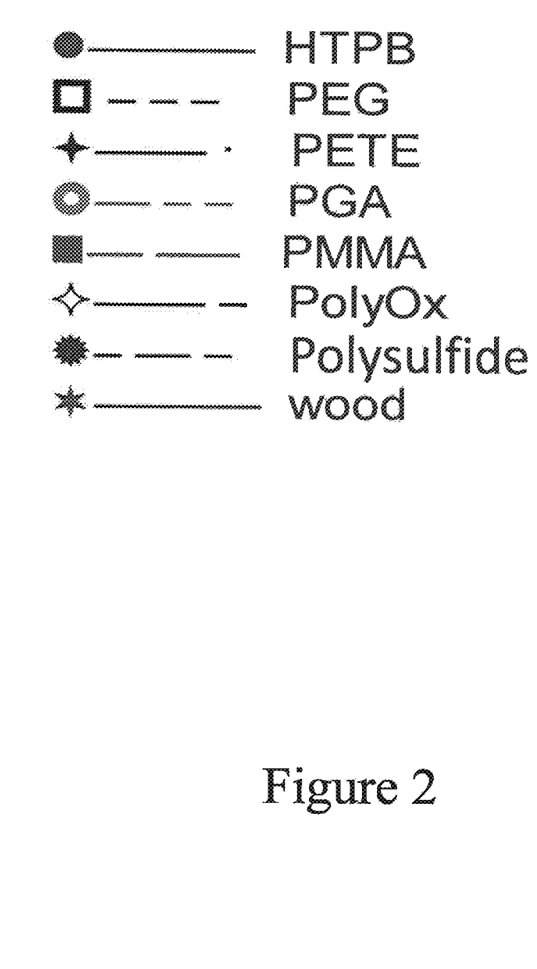
FIG. 2 is a legend for FIG. 1 indicating components plotted and corresponding symbols.

It was determined that an acceptable fuel candidate would need a thermal decomposition temperature of approximately 300° C. or lower. Thermogravimetric (TGA) analysis was conducted on several candidate fuel polymers to determine the temperature for the onset of thermal decomposition for each material. This survey of materials included hydroxyl terminated poly butadiene (HTPB), which is considered by many to be the current industry standard for a ramjet fuel polymer. Other polymers were also considered as possible fuel candidates from the materials that have been discussed in the literature. Only cellulose based materials and polyoxylene approached the desired decomposition temperature. These results are shown in FIG. 1 with a legend explaining FIG. 1 symbols in FIG. 2. The survey in FIG. 1 also included the following other fuel polymers: hydroxyl terminated polybutadiene (HTPB), polyethylene glycol (PEG), polyethylene terephthalate (PETE), polyglycolic acid (PGA), polymethyl methacrylate (PMMA), polyoxylene (PolyOx), polysulfide and wood (yellow poplar). Note in FIG. 1 that HTPB has a peak mass loss temperature of approximately 460° C.

A Solid Fueled Ramjet cycle and trajectory analysis has been conducted to develop design parameters for a proposed Army deep strike mission. The analysis showed that an acceptable fuel candidate would need a thermal decomposition temperature of approximately 300°. Thermogravimetric Analysis (TGA) has also been conducted on several candidate fuel polymers to determine the temperature for the onset of thermal decomposition for each material. This survey of materials included HTPB which is widely considered as the current industry standard ramjet fuel polymer. Other polymers considered included but not limited to materials that have been discussed in the literature as possible fuel candidates. Only cellulose based materials and polyoxylene approached the desired decomposition temperature of approximately 460°.

Noting that many of the decomposed gasses tested in FIG. 1 ignited and burned at the decomposition temperature of at least 310° C. for free stream enthalpy ignition, a literature search was conducted to identify gas species that had ignition temperatures of approximately 300° C. or lower. The literature search showed that several sulfur containing gasses, to include carbon disulfide and hydrogen disulfide, had ignition temperatures that were below the 300° C. threshold. It was found that a polysulfide based polymer material can have both the low thermal decomposition temperature and decomposition gasses that would ignite below 300° C.

In one embodiment, the present invention relates to a Ramjet solid fuel having an ignition temperature of less than 400° C., the fuel comprising a copolymer of BMPP and HTPB, the copolymer having a BMPP/HTPB weight ratio of from 1/3 to 3/1; and the fuel comprising at least 85 weight % copolymer. Further to this embodiment, the Ramjet solid fuel further comprises between 10 and 16 weight percent IPDI (Isophorone diisocyanate), and less than 1 weight percent dibutyltin. Still further to this embodiment of the Ramjet solid fuel, the ignition temperature is less than 312° C.

In another embodiment, the invention relates to a method of making Ramjet solid fuel having an ignition temperature of less than 400° C., comprising the steps of: combining components to form a fuel composition, the components of the composition including a copolymer of BMPP and HTPB, the copolymer having a BMPP/HTPB weight ratio of from 1/3 to 3/1; and the fuel comprising at least 85 weight % copolymer. Further to this embodiment, the components of the composition further comprise between 10 and 16 weight percent IPDI (Isophorone diisocyanate), and less than 1 weight percent dibutyltin. Still further to this embodiment, the ignition temperature is less than 312° C.

In yet another embodiment, the invention relates to a method of using Ramjet solid fuel comprising BMPP and, the method causing the Ramjet solid fuel to self-ignite at a temperature of less than 400° C., the method comprising the step of: forming a Ramjet solid fuel including a copolymer of BMPP and HTPB, the copolymer having a BMPP/HTPB weight ratio of from 1/3 to 3/1; and the fuel comprising at least 85 weight % copolymer; placing the Ramjet solid fuel in an ambient environment; and heating the Ramjet solid fuel with no external ignition source to cause the Ramjet solid fuel to self-ignite at no more than 400° C. by progressively increasing the temperature of the Ramjet solid fuel until ignition is achieved. Further to this embodiment, the composition of the Ramjet solid fuel further comprise between 10 and 16 weight percent IPDI (Isophorone diisocyanate), and less than 1 weight percent dibutyltin. Still further to this embodiment, the ignition temperature is less than 312° C.

To verify these methods and configurations, the following experiments were conducted and described in the Examples below.

EXAMPLES

Example 1

Within a period of six months pipe burner combustion tests were conducted in the 7155 Lab 1 flame hood. Approximately twenty small propellant candidate samples of BMPP/HTPB copolymer and approximately thirty small propellant candidate samples of sulfur doped BMPP/HTPB copolymer were placed in separate instances into a 1.0 in diameter pipe that is approximately 12 inches in length. The samples on average were strips with dimensions of 127 mm long, 15 mm wide, and 5 mm thick. In each instance, an industrial heat gun was placed at the opening of the pipe and set to 17 SCF/minute flow rate at ambient pressure. Each of the samples was ignited and successfully burned at ambient pressures.

Example 2

A polysulfide based adhesive was obtained and TGA and heat gun ignition tests on a cured sample were conducted. The TGA showed the polysulfide based sulfide material to have a thermal decomposition temperature of 300° C., as seen in FIG. 1 (with a legend explaining FIG. 1 symbols in FIG. 2).

Example 3

With these positive results, a large quantity of liquid polysulfide polymer (BMPP) was purchased to begin formulation studies to develop a material that had the decomposition and auto ignition temperatures that are required. Likewise the formulation needed to have structural/mechanical properties that were suitable for a rocket motor application.

Figure 3:
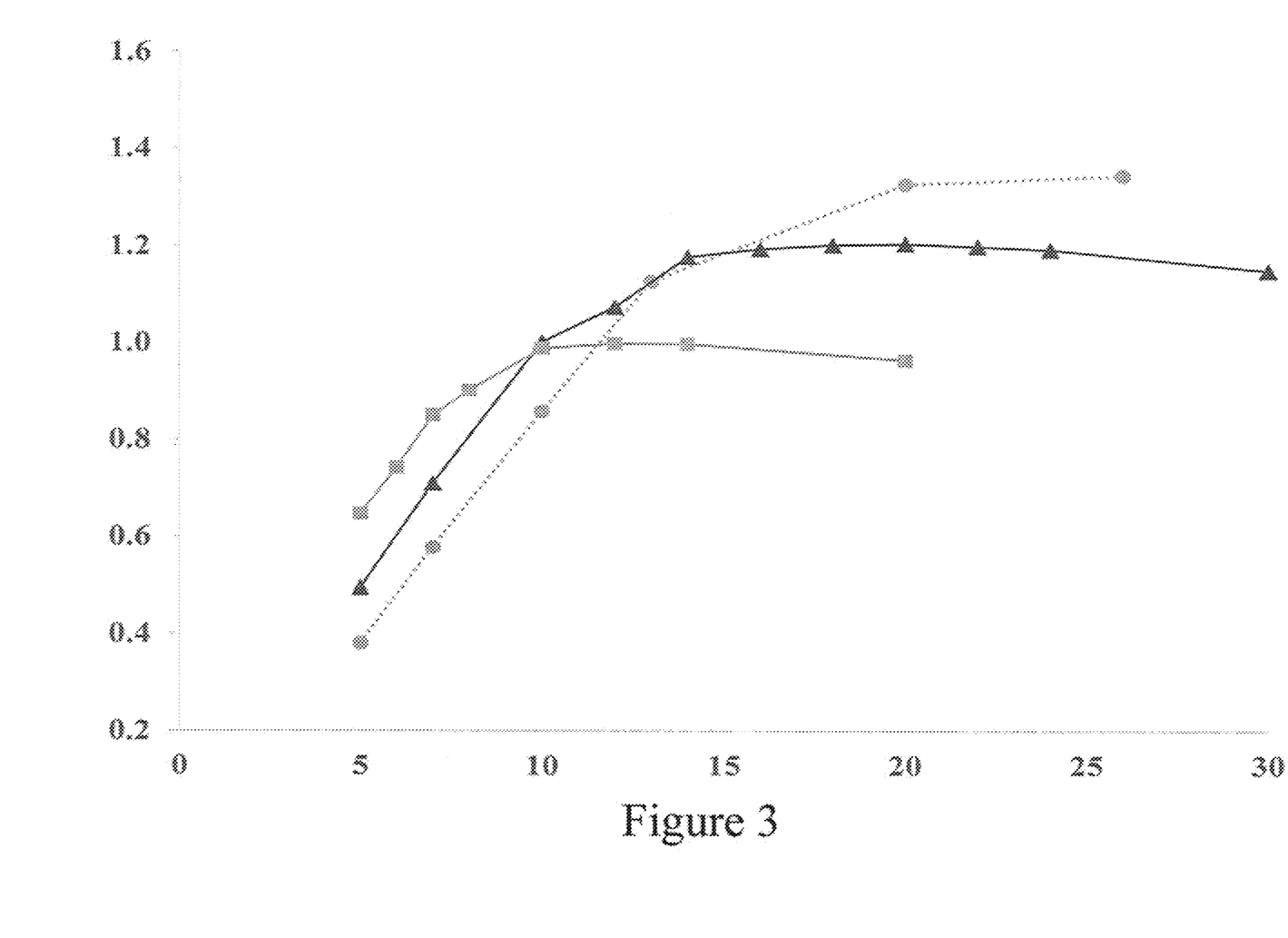
FIG. 3 is a graph plotting Normalized Density Impulse vs. Air to Fuel Ratio for HTPB, BMPP-HTPB copolymer, and LP-33.
Figure 4:
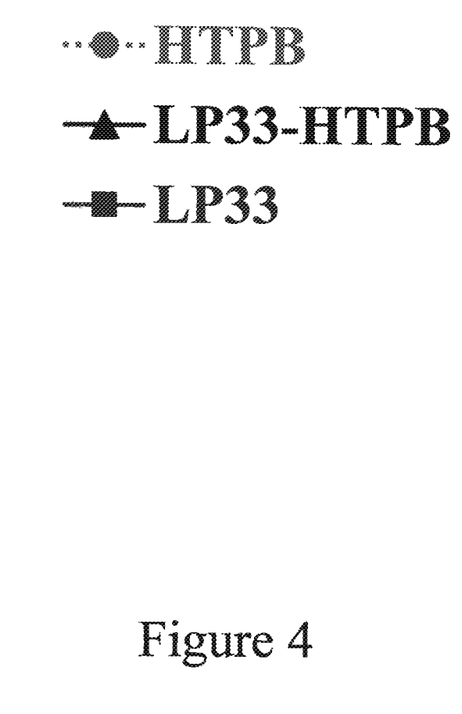
FIG. 4 is a legend for FIG. 3 indicating components plotted and corresponding symbols.

BMPP and HTPB were combined in a ratio of 50:50 to assess the performance of the candidate fuel copolymer. Thermochemical calculations were made and are shown in FIG. 3 (with a legend explaining FIG. 3 symbols in FIG. 4) where the parameter of Isp-density is shown at a Mach number and altitude of 3 and 18 km respectively. Note that the copolymer shows approximately 2/3 of the performance of HTPB as compared to the BMPP formulation.

Example 4

Three variants of the copolymer were formulated, mixed and tested in Differential Scanning Calorimetry (DSC), TGA, and in pipe combustor tests. All formulations used IPDI as the curative with dibutyltin as the catalyst.

TABLE 2

Copolymer Fuel Formulations

| Ingredient Mass (grams) | PS25HT | PS50HT | PS75HT |
| --- | --- | --- | --- |
| BMPP (LP-33) | 12.5 | 25 | 37.5 |
| HTPB | 37.5 | 25 | 12.5 |
| IPDI | 6.5 | 8.1 | 9.6 |
| Dibutyltin | 1 | 1 | 1 |

Figure 5:
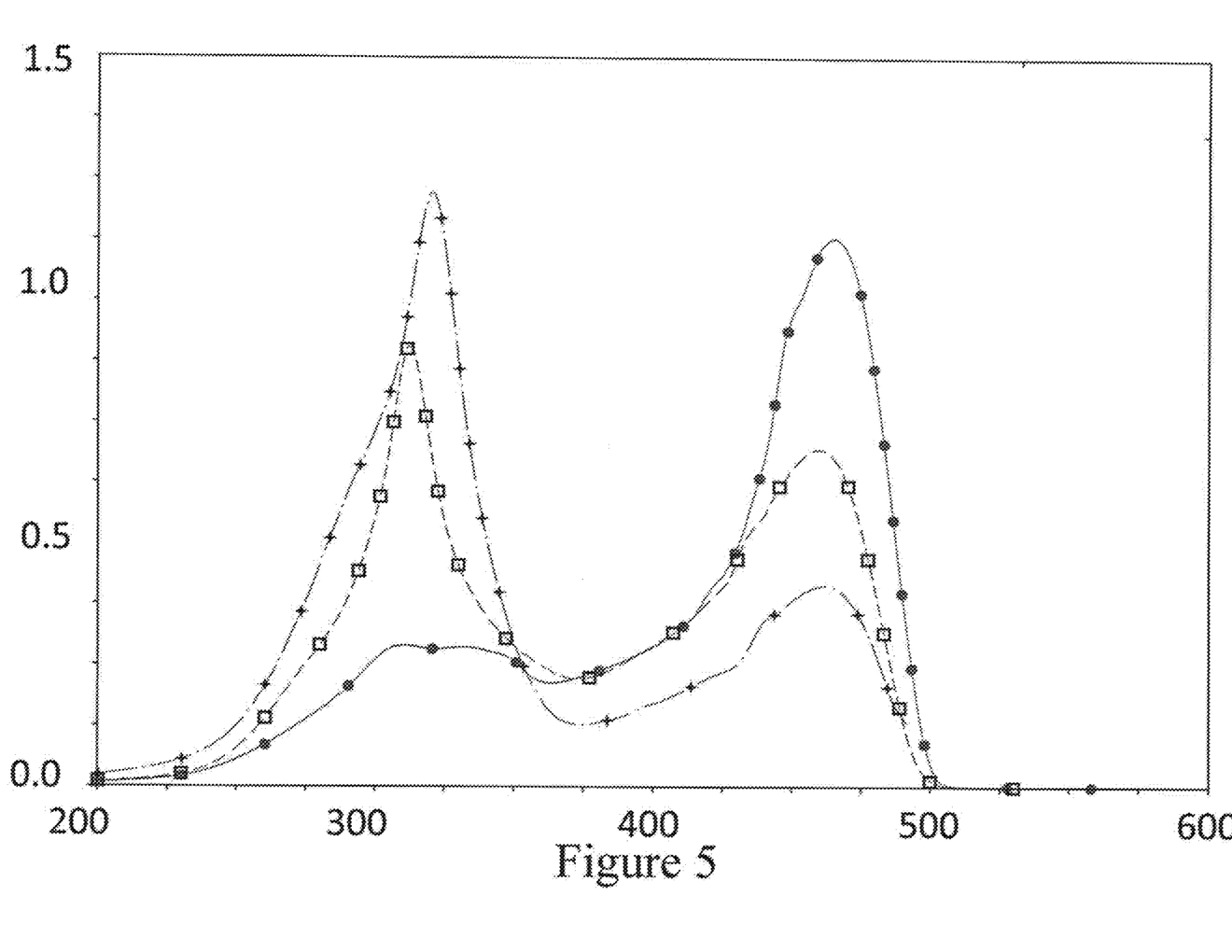
FIG. 5 is a graph plotting Derivative Weight vs. Temperature of three different formulations of BMPP-HTPB copolymer.
Figure 6:
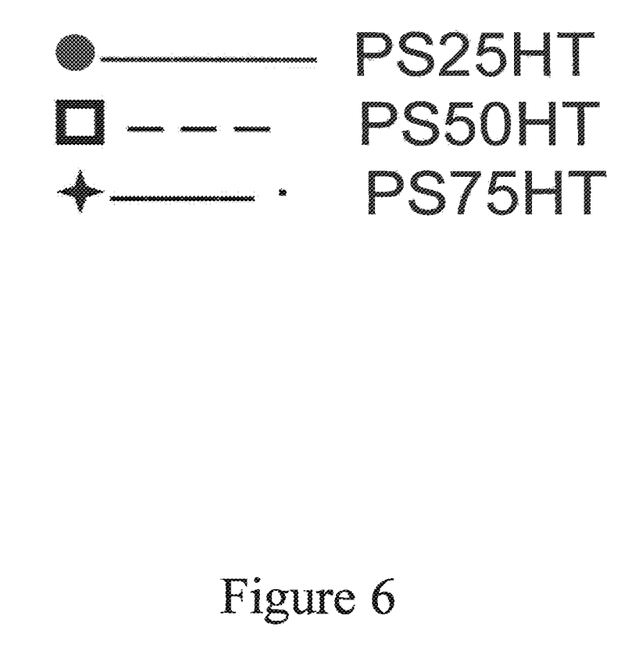
FIG. 6 is a legend for FIG. 5 indicating components plotted and corresponding symbols.

The candidate fuels were subjected to TGA and DSC to obtain the thermal decomposition temperatures and determine the location of the first endothermic or exothermic peaks. FIG. 5 (with a legend explaining FIG. 5 symbols in FIG. 6) shows the TGA results of the three formulations. Note that two peak mass loss temperatures are evident in the plot. The magnitude of each scales with the ratio of BMPP to HTPB. As the ratio increases, the lower temperature reflects an increase in the percent of mass loss in correlation with the increased BMPP in the formulation.

Figure 7:
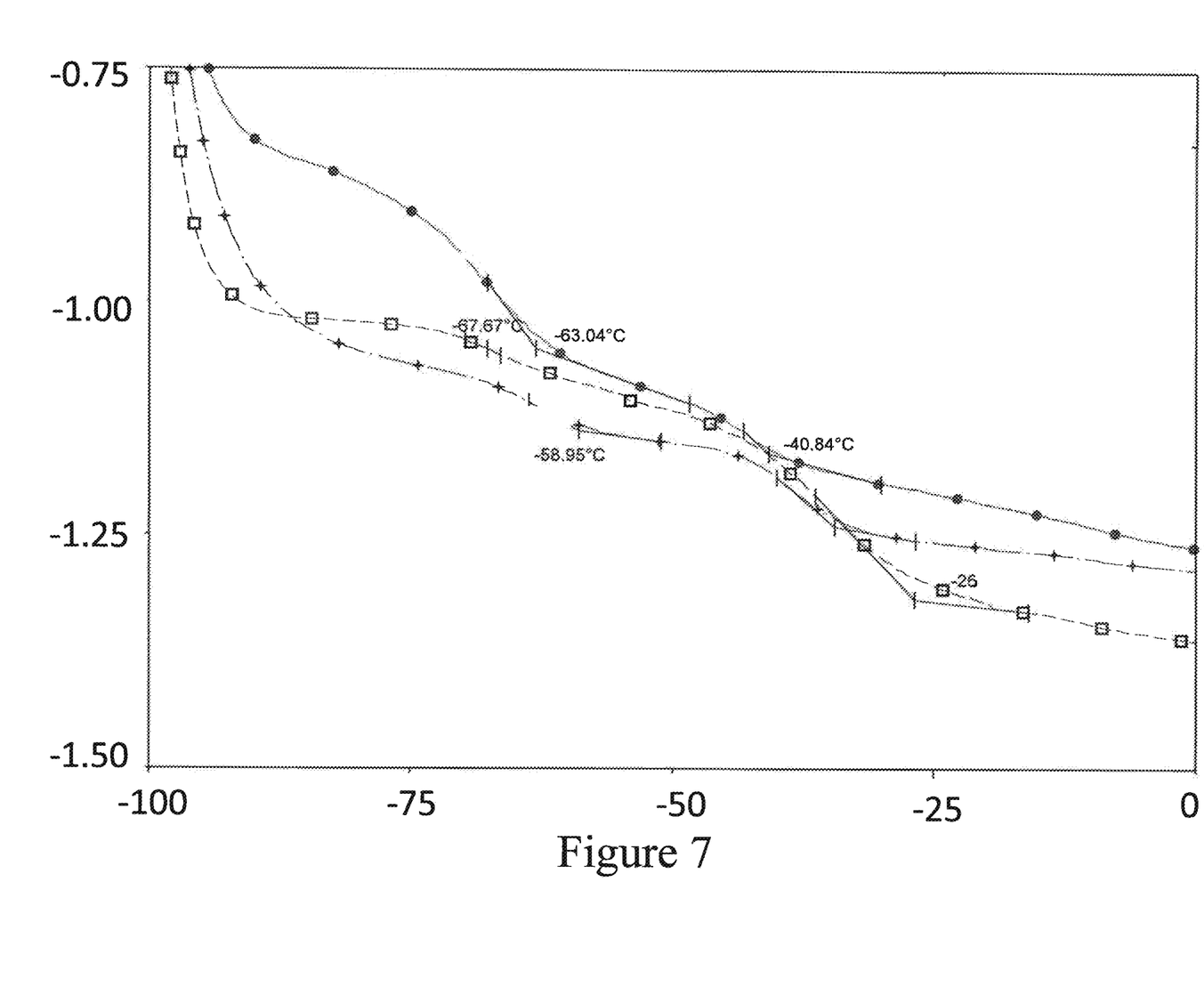
FIG. 7 is a graph plotting heat flow vs. temperature for three different formulations of BMPP-HTPB copolymer.
Figure 8:
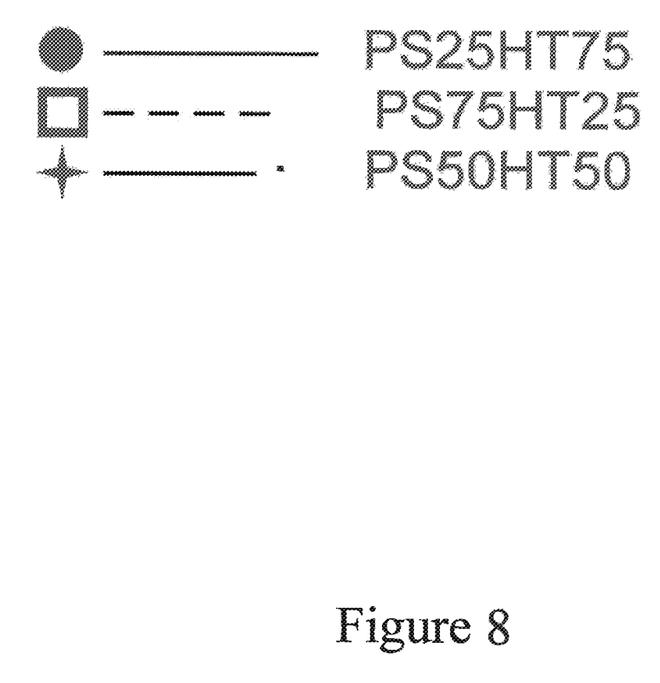
FIG. 8 is a legend for FIG. 7 indicating components plotted and corresponding symbols.

FIG. 7 (with a legend explaining FIG. 7 symbols in FIG. 8) shows the DSC results for the three copolymer formulations between the temperature range of −100° C. and 0° C. All three curves show two distinct specific heat (Cp) changes in the DSC curves. The magnitude and location of the Cp transitions move with the ratio of BMPP to HTPB. As the HTPB increases the temperatures move down, while they move up with increasing LP-33.

Figure 9:
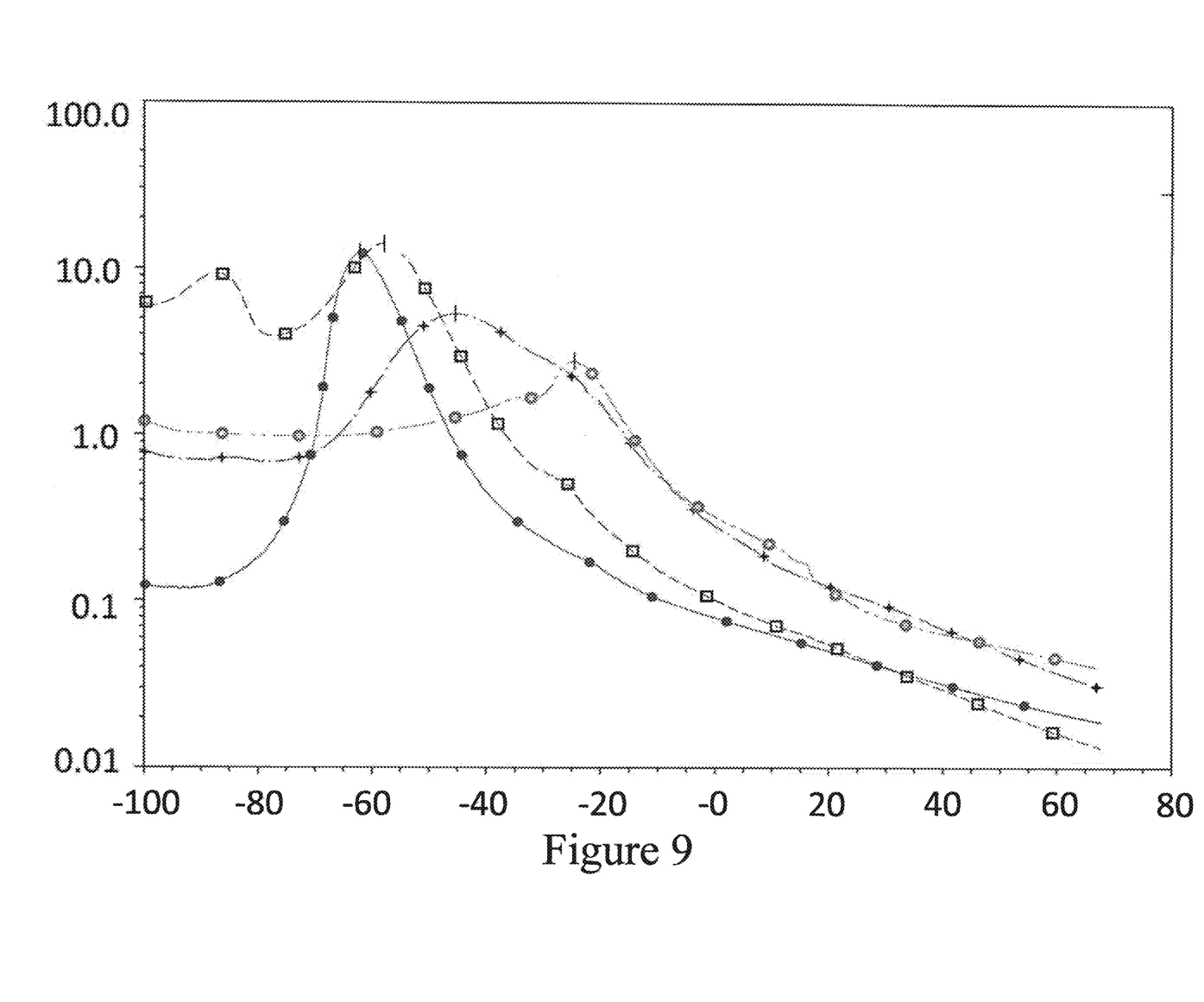
FIG. 9 is a graph plotting loss modulus vs. temperature for two copolymer blends of BMPP-HTPB as well as LP-33 and HTPB.
Figure 10:
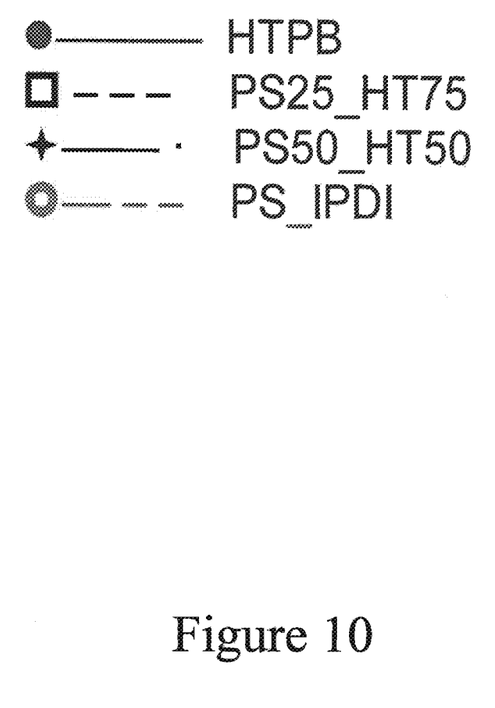
FIG. 10 is a legend for FIG. 9 indicating components plotted and corresponding symbols.

FIG. 9 (with a legend explaining FIG. 9 symbols in FIG. 10) show the Dynamic Mechanical Analysis (DMA) results of the loss modulus for two copolymer blends, BMPP and HTPB material samples. The peak of the loss modulus curve represents the glass transition temperature (Tg) of the material and is annotated in the figure at the peaks of each curve. Note that that Tg moves from between the two extreme values of BMPP to HTPB based on the blend ratio. Also of note is the convergence of the BMPP and the 50% blend curves and the convergence of the HTPB blend with the 25% blend.

Figure 11:
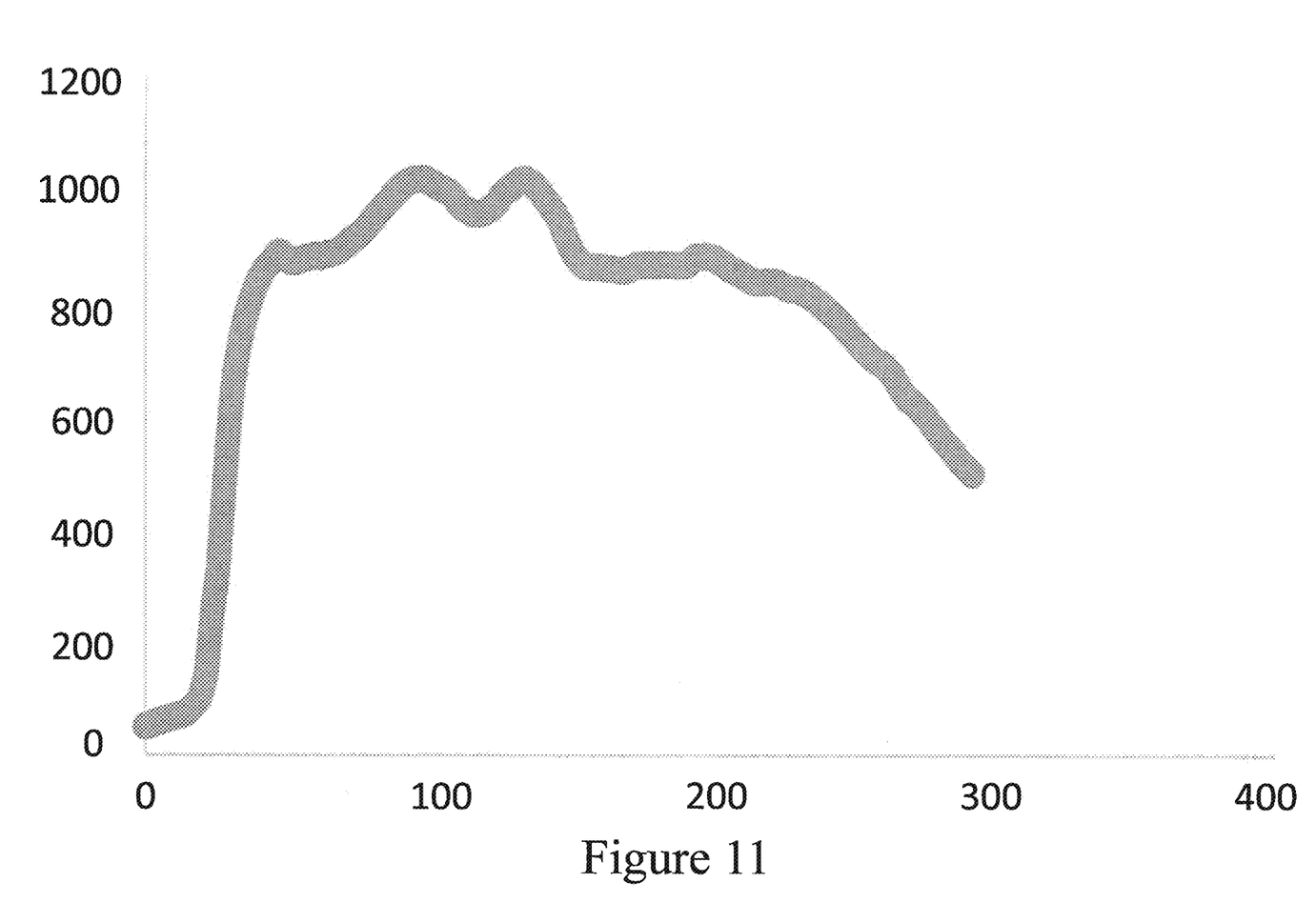
FIG. 11 is a graph plotting exit temperature vs. time. The data shows a peak temperature of 1020° C. which occurred at an air to fuel ratio of approximately 24:1.

FIG. 11 shows an exit temperature measurement from subscale pipe combustor tests. The data shows a peak temperature of 1020° C. which occurred at an air to fuel ratio of approximately 24:1.

While several embodiments have been described in detail, it will be apparent to those skilled in the art that the disclosed embodiments may be modified. Therefore, the foregoing description is to be considered exemplary rather than limiting.

What is claimed is:

1. A Ramjet solid fuel having an ignition temperature of less than 400° C., the fuel consisting essentially of a copolymer of bis-(ethylene oxy) methane polysulfide polymer (BMPP) and hydroxyl-terminated polybutadiene (HTPB); isophorone diisocyanate (IDPI); and butyltin; the copolymer having a BMPP/HTPB weight ratio of from 1/3 to 3/1; and the fuel thus consisting essentially of between 83 and 87 weight % copolymer, between 11 and 16 weight % IPDI (Isophorone diisocyanate), and between 0 and 2% butyltin;

wherein the BMPP comprises from 5 to 8 weight percent mercaptan;

and wherein BMPP is selected from $HS(RSS)_a CH_2 CH((SSR)_c CSH)CH_2(SSR)_b SH$  a)

Where R=—$(CH_2)_2 OCH_2 O(CH_2)_2$—
And a+b+c<7; and $H(SC_2H_4OCH_2OC_2H4S)_n H$  b)

Where n=7.

2. The Ramjet solid fuel according to claim 1, wherein the ignition temperature is less than 312° C.

* * * * *